Jan. 29, 1924.  
W. A. BOCKIUS  
BUMPER  
Filed Oct. 15, 1921  
1,481,789
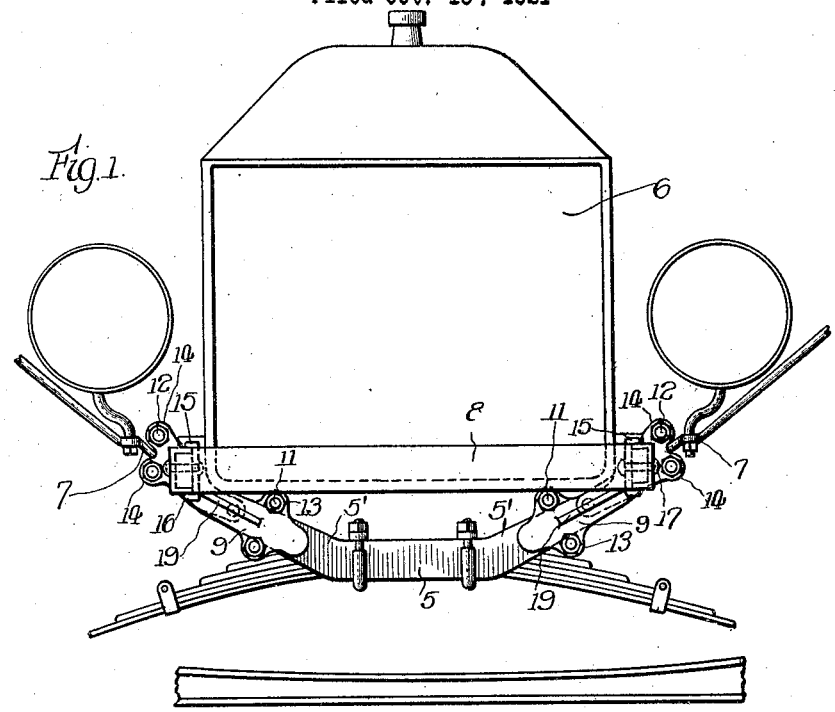
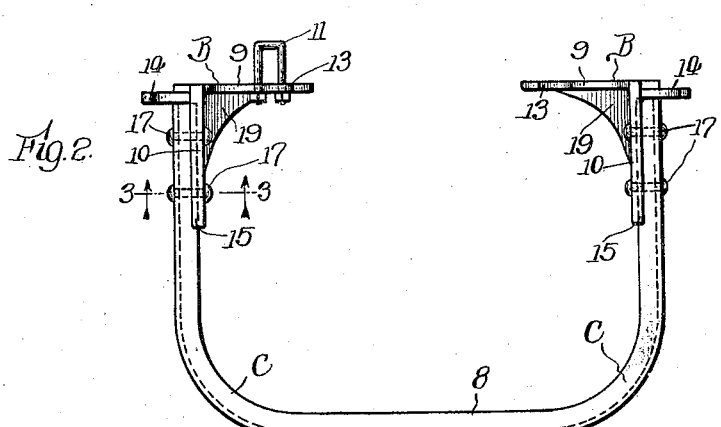
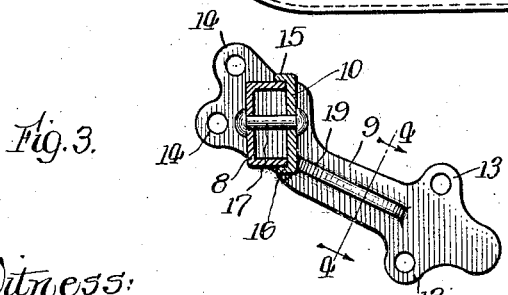
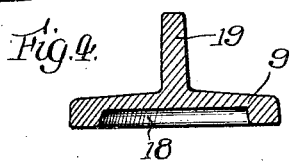
Inventor:  
Walter A. Bockius,  
By Fred Jensen  
his Atty.
Witness:  
A. J. Sauser Patented Jan. 29, 1924.

1,481,789

UNITED STATES PATENT OFFICE.

WALTER A. BOCKIUS, OF WILMETTE, ILLINOIS, ASSIGNOR TO THE BECKLEY-RALSTON COMPANY, OF CHICAGO, ILLINOIS, A CORPORATION OF ILLINOIS.

BUMPER.

Application filed October 15, 1921. Serial No. 507,389.

*To all whom it may concern:*

Be it known that I, WALTER A. BOCKIUS, a citizen of the United States, and a resident of Wilmette, in the county of Cook and State of Illinois, have invented certain new and useful Improvements in Bumpers, of which the following is a full, clear, and exact description.

My invention relates to bumpers for Ford cars, particularly Ford trucks, and the object of the invention is to provide a stronger and more compact bumper, and one which is more adapted to truck service than the type of bumpers now in use on Ford trucks.

The construction and the application of my improved bumper is shown on the accompanying drawing, in which—

Fig. 1 is a front elevational view of a Ford machine showing the bumper in place thereon, Fig. 2 is a plan view of the bumper, Fig. 3 is an enlarged sectional view on plane 3—3, Fig. 2, and Fig. 4 is an enlarged sectional view on plane 4—4, Fig. 3.

In Fig. 1. 5 represents the front cross member of the chassis frame, 6 represents the radiator, and 7 represents the lamp supporting brackets which extend from the chassis near the front corners thereof.

The bumper bar 8 of my improved bumper structure is of U-shape and preferably made from a single piece of channel bar with the channel flanges extending inwardly. The U-shape bar is of just sufficient width to span the radiator at the lower end thereof and to afford protection for the lamp brackets and lamps. The bumper structure is supported so that all blows thereon are taken up directly by the chassis and I provide the brackets B which may be detachably secured against the front cross member 5 and which rigidly support the bumper bar 8 in horizontal position. Each bracket comprises a base part 9 and a forwardly extending wall 10 against which the ends of the bumper bar are secured. The base 9 deflects downwardly at an angle with reference to the vertical wall 10 so as to follow the slope of the outer ends 5' of the chassis front cross member 5. The bases of the brackets engage flatly against the front face of the cross member and are rigidly secured preferably by U-bolts 11 and 12, the ears 13 being provided at the inner end of each base for the bolt 11 and the ears 14 being provided at the outer end of the base for the bolt 12, the bolt 11 extending around the cross member 5. In order to extend the bumper bar a distance beyond the radiator sides so as to afford better protection for the lamp brackets and lamps, the bases 9 extend beyond the ends of the cross member and the bolts 12 receive the lamp brackets 7. The bumper bar supporting walls 10 appear outside of the radiator and the limbs of the bumper bar engage against the outer sides of the walls as clearly shown in Fig. 3. To afford greater supporting strength, upper and lower flanges 15 and 16 are provided on the walls 10 between which the bumper bar ends are rigidly held against vertical displacement. At its ends the bumper bar engages directly against the bases 9 of the brackets, and bolts or rivets 17 extending through the bar and the walls 10 rigidly lock the bar in its supported position, all bumps on the bar being directly communicated to the brackets and by the brackets to the machine chassis frame. As shown in Fig. 4, the bases 9 of the brackets have channels or depressions 18 in their rear sides for receiving rivet heads or other projections on the front face of the cross member 5 so that the base members may engage flatly against the cross member at all times and be securely seated thereagainst. To strengthen the brackets the webs 19 are provided between the bases and the walls 10, each bracket being preferably in the form of an integral casting. Where the lamp brackets supporting bases extend a distance in front of the chassis frame, the bolt receiving wings 14 may be offset forwardly a distance from the bases 9, as shown in Fig. 2. The limbs of the bumper bar 8 are substantially in direct alinement with the side beams of the chassis frame so that all blows will be taken up by the chassis frame and not by the lamp brackets, the lamp brackets serving merely to assist in supporting the bumper in place, and the bolt receiving wings, being in front of the lamp brackets, will afford protection for such brackets.

The bumper structure of my invention is very compact and possesses great strength, all bumps against the bar being transmitted directly rearwardly to the chassis frame of the vehicle, the bar sides being in line and parallel with the chassis side beams. My improved structure is also more resistant to side bumps than are the looped fender structures now extensively used on Ford cars. I make the corners C of my U-bumper bar well rounded, this preventing interlocking or catching of the bumper structure in collisions and acts to deflect and fend off other vehicles. The gradual bend also greatly increases the strength of the bumper structure. By being compact and with its rigid sides alongside of the radiator, greater protection is afforded for the radiator, and, by extending well forwardly, it shields and protects the lamp brackets and lamps from bumps and blows. Not only is my compact structure stronger and more efficient than the laterally extended flimsy structure heretofore used, but it gives a more efficient and satisfactory appearance to Ford cars, especially trucks.

I do not desire to be limited to the exact construction and arrangement shown, as changes and modifications are possible which would still come within the scope of the invention.

I claim as my invention:

1. In a bumper for vehicles, the combination of a U-shaped bumper bar, brackets secured to the ends of said bar and having inwardly and transversely extending portions shaped to fit against the front face of the front cross-member of the vehicle chassis and perforated portions extending above and below said members, and U-bolts having their legs extending forwardly above and below said member and extending across the back of said member to secure the brackets against the front of and to said member.

2. A bumper structure for Ford motor vehicles comprising a U-shape bumper bar, supporting brackets, each bracket having a base part and a wall extending forwardly therefrom intermediate its ends, said bumper bar engaging at its ends against said base parts and against the outsides of said walls and being rigidly secured to said walls, the inner ends of said base parts being adapted to engage against the front face of the front cross member of the vehicle chassis frame, wings on said inner ends for receiving U-bolts which engage around the cross member, the outer ends of said base parts being in front of the lamp supporting brackets of the vehicle and being provided with bolt holes for receiving fastening members adapted to engage with said lamp brackets.

3. The combination with the chassis frame of a Ford motor vehicle, of a bumper structure, said bumper structure comprising a U-shape bumper bar and supporting brackets therefor, each bracket comprising a base part and a wall extending forwardly therefrom, each wall being channeled longitudinally on its outside to receive the side walls of said bumper bar, means for securing the bumper bar to said walls, said base parts being adapted to fit against the front face of the front cross member of the chassis and the distance between the ends of said bumper bar being substantially equal to the horizontal extent of said cross member whereby the side of said bar will extend horizontally forwardly in line with the side beams of the chassis frame, the outer ends of said base parts extending a distance in front of the lamp supporting brackets on said chassis frame.

In witness whereof, I hereunto subscribe my name this 9th day of September A. D., 1921.

WALTER A. BOCKIUS.